Feb. 18, 1958   L. R. BRIDGE ET AL   2,823,756
TRANSPORTABLE JET ENGINE TEST STAND
Filed Oct. 12, 1956   4 Sheets-Sheet 1
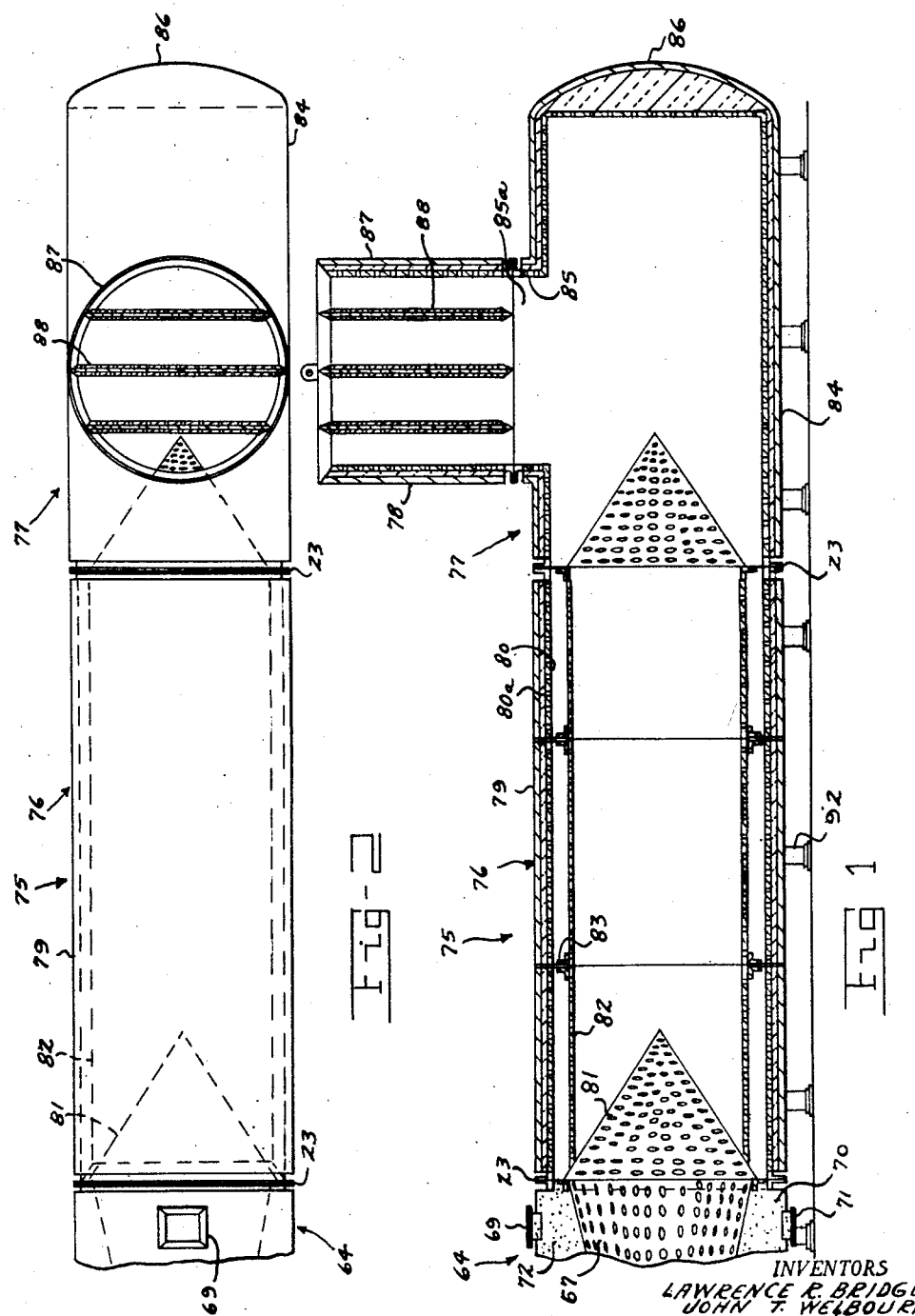
INVENTORS
LAWRENCE R. BRIDGE
JOHN T. WELBOURN
BY Wade Koontz
John E. Reilly
ATTORNEYS

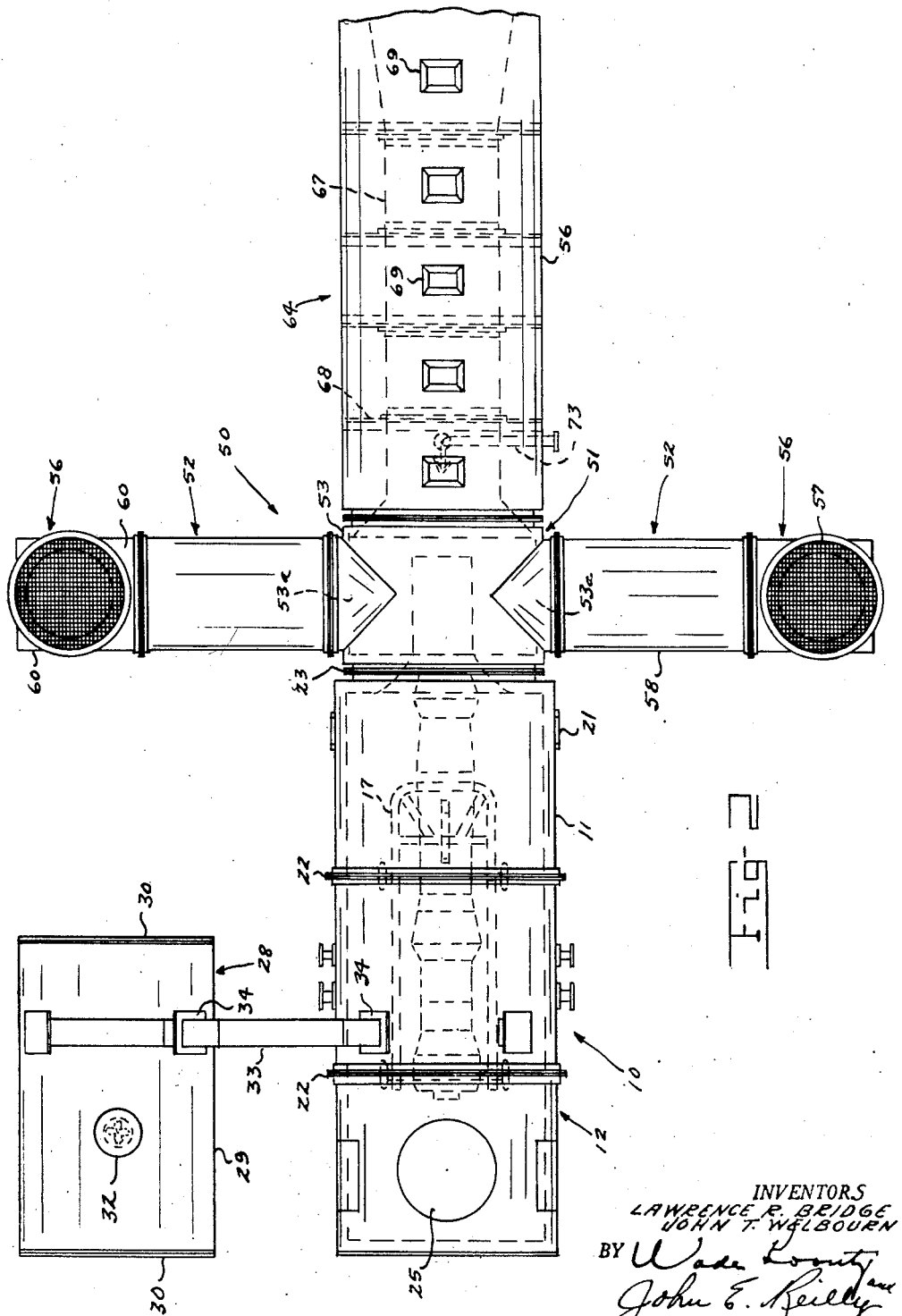

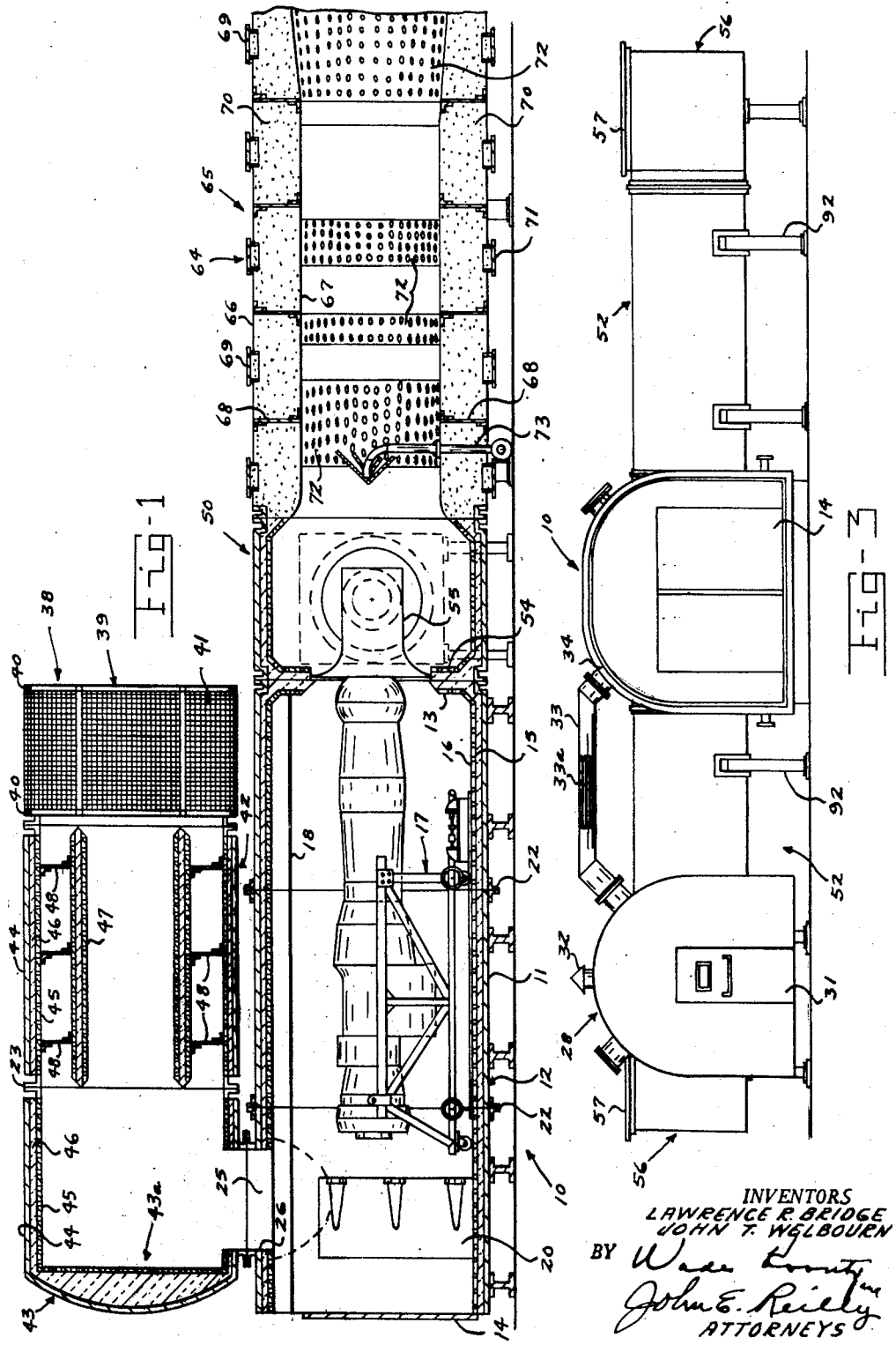

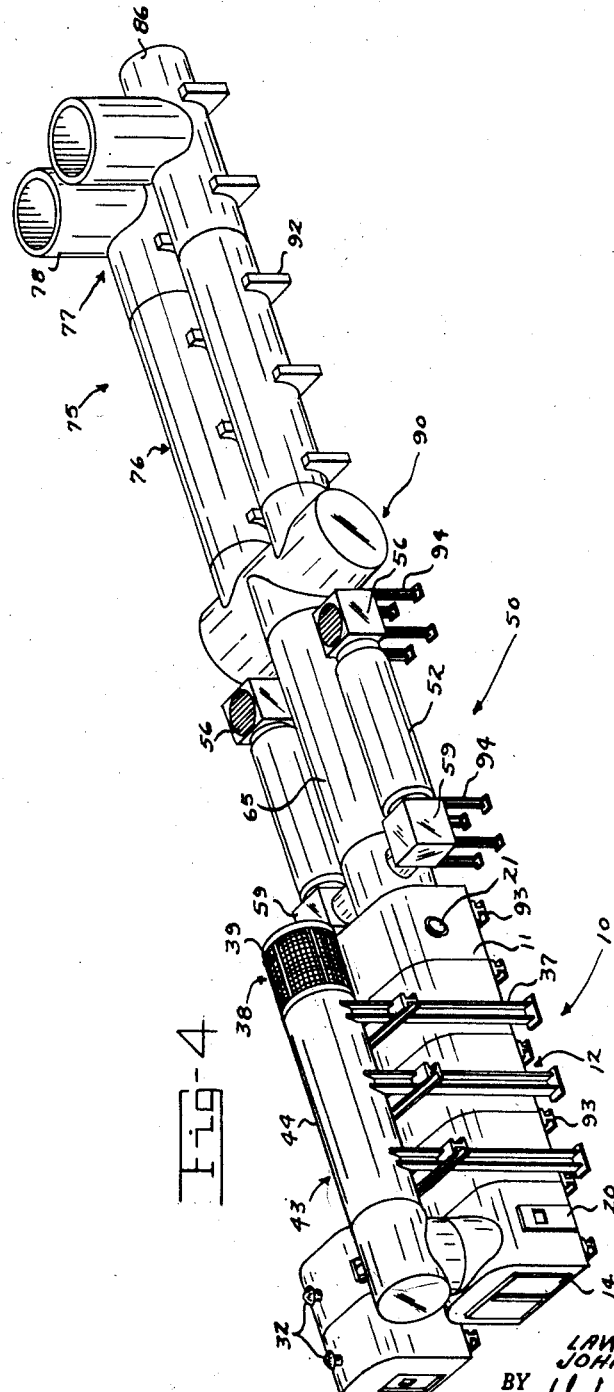

United States Patent Office 2,823,756
Patented Feb. 18, 1958

2,823,756

TRANSPORTABLE JET ENGINE TEST STAND

Lawrence R. Bridge, Dayton, Ohio, and John T. Welbourn, Pittsburgh, Pa.

Application October 12, 1956, Serial No. 615,725

10 Claims. (Cl. 181—35)

(Granted under Title 35, U. S. Code (1952), sec. 266)

The invention described herein may be manufactured and used by or for the United States Government for governmental purposes without payment to us of any royalty thereon.

The present invention relates to certain new and useful improvements in engine test stand installations to be utilized in the ground testing of rocket or jet engines; and more particularly, the present invention relates to a portable, prefabricated test stand installation which is comprised of a number of independent units of the "knock-down-build-up" type coupled together to control and limit the noise produced by the engine being tested.

In jet engine test stand construction, it has been common in the past to construct a permanent enclosure which is tailored for the testing of a particular type or series of engines. Usually the engine enclosure itself is a concrete cell, and the air inlets and exhaust sections are formed either of heavy sheet metal or concrete panels and supported upon or encased in, a concrete foundation. This manner of contruction has been considered to be necessary due to the extreme vibrations and pressures encounteed in testing aircraft engines; also, such testing operations require a well insulated enclosure to limit the noise produced. Furthermore, a larger, more permanent type engine enclosure is required to accommodate the great volume of air introduced in the engine unit for combustion and outside cooling of the engine.

Unfortunately, the currently used concrete test stands have several disadvantages: They must be constructed for the testing of particular engines and consequently must be completely rebuilt at a very high cost in order to accommodate other types of engines. When repairing of a test stand section is required, entire sections and often the entire test stand must be rebuilt due to their inflexibility.

Of course, it is not possible to start construction on the more permanent type test stands until a requirement is made for one with particular specifications, and a site is selected which will accommodate the test stand. As a result, considerable delay is usually experienced from the time the test stands are requested until they are built. In addition, when test stands are needed temporarily at particular sites a new stand must be constructed instead of transporting another test stand from another location. Also, due to their complexity and bulk, present test stands must be constructed and maintained in operating condition by specially trained personnel and, where crowded conditions exist in industry or factories, particularly those in large cities, it is necessary to set up the test stands in isolated areas where sufficient space is available for the test cell installations.

Heretofore, it was not considered feasible nor possible to overcome the above disadvantages evidently due to the extreme noise and vibration characteristics of present aircraft engines, along with the volume of air flow thought to be necessary in the engine test cell as previously explained. However, the present invention has overcome the obstacles and difficulties as hereinbefore set forth by providing an aircraft engine test stand installation incorporating a combination of novel features in which the entire structure can be prefabricated, including the engine enclosure unit, for transportation to desired locations and adaptation for the testing of various series and types of jet engines or the like. This is accomplished primarily by disposing the secondary air inlet sections rearwardly of the engine enclosure unit in a unique manner so that the enclosure unit does not have to accommodate large volumes of air for cooling nor provide heavy insulation for noise reduction purposes. With the novel construction provided in the present invention adequate cooling and noise reduction is maintained in the entire installation unit together with a steady, controlled flow of air into the engine by the cooperative action of a series of individual, compact and transportable sections which can be quickly assembled into a unitary structure.

It is accordingly an object of the present invention to provide a transportable engine test stand which may be expanded or modified, if necessary, either to accommodate a variety of classes and types of engines or to increase or decrease the noise control; and wherein no units of the installation need be discarded or reworked, but are capable of being easily replaced by additional units or possible relocation of existing units.

It is another object to provide a portable, prefabricated test stand installation in which the entire structure may be assembled, used, disassembled, transported to a new site, reassembled, and placed in use again without loss of any parts, except gaskets, and without requiring specially trained personnel.

It is another object to provide a transportable test stand installation having a unique, compact system for the noise limiting of both low and high frequency sound waves, and for the reduction of turbulence and velocity of the discharge gases.

It is an additional object to provide a prefabricated test stand installation including a unique primary and secondary air flow system to permit the complete prefabrication of the test stand assembly into transportable compartments.

It is still another object to provide a jet engine test stand installation in which the secondary air silencer system is disposed rearwardly of the engine enclosure unit in such a way that a compact, prefabricated engine enclosure unit can be constructed embodying the desirable characteristics of the larger, more permanent engine enclosure cells in present use.

It is a further object to provide a portable, prefabricated test stand installation of comparatively low cost which includes tubular or curved metal compartments combining favorable pressure and temperature resistance properties with novel noise reducing characteristics, and which is conformable for testing of various types and sizes of aircraft engines.

It is still a further object to provide a transportable jet engine test stand installation formed of a series of easily connectable tubular and curved metal segments and sections which may be modified or altered in assembling to conform to existing space requirements.

Other objects and features of the invention will become apparent from the following detailed description of the preferred embodiment in which reference is made to the accompanying drawings in which:

Fig. 1 is a longitudinal sectional view of the general arrangement of the test stand assembly;

Fig. 2 is a top plan view of the test stand assembly with the primary air section removed;

Fig. 3 is an end view of the operator's enclosure unit and engine enclosure unit of the test stand; and Fig. 4 is a perspective view of a somewhat modified form of test stand.

Referring more particularly to the drawings, there is shown an engine enclosure unit 10 having an outer shell portion 11 which is formed by connecting a number of prefabricated compartments 12 together. The side and top portions of each compartment are formed of a continuous metal sheet forming an archway or inverted U-shaped member with a flat surfaced metal sheet welded to the bottom edges of the compartment to form the floor portion. Each compartment is insulated by inserting acoustical material 15, such as fiber glass, between an inner concentric perforated lining 16 and the outer shell 11 of the compartments. An annular air flow baffle plate 13 is mounted at the exit end of the compartment to form a restricted opening slightly larger in diameter than the discharge end of the engine, and removable panel 14 is secured to the entrance end of the enclosure unit with doorways which can be opened and closed for slidable disposition of a jet engine or the like into the enclosure. Suitable positioning means are supplied within the enclosure for mounting the jet engines for testing, such as a thrust measuring stand 17 as shown, together with a monorail 18 secured to the top inner surface of the outer shell and extending the length thereof. A doorway 20 and observation ports 21 are also provided as shown each having safety or bulletproof glass window portions. The compartments 12 are easily assembled in place at the desired location by means of flanges 22 encircling the outer edge of the ends of each compartment for interconnection therebetween by means of suitable connection means such as studs or latch bolts. Also the contact surface of each flange is provided with a gasket portion so as to form an airtight seal between the flanges 22 when the gaskets are secured together. Annular flanges or adaptors 23 are also preassembled at the entrance and exit ends of the engine enclosure unit with fitted gaskets for connection with the other sections.

The forward compartment of the enclosure unit is provided in the top surface of the outer shell portion with a circular air inlet opening 25 having a tubular entrance duct fitting 26 connected thereto, the tubular shell portion of the entrance duct 26 being insulated in the same manner as the main enclosure unit.

An operator's enclosure unit 28 is shown in laterally offset relation to the engine enclosure unit 10 having an elongate outer shell compartment 29, designed and insulated in the same manner as the compartments 12 of the engine enclosure unit. The operator's enclosure unit 28 including the compartment 29 is also prefabricated with front and rear panels 30 secured to the open ends of the compartment 29, doorways 31 being formed out of the panel portions and suitable ventilating means represented at 32 in the top surface of the shell. Instrument racks (not shown) are also preassembled and secured to the side inner portions of the compartment 29 for placement of the control and instrument units. An instrument cable duct 33 interconnects the operator's enclosure unit 28 and engine enclosure unit 10 having suitable fittings for insertion into bulkhead openings 34 provided in both units. The instrument duct encloses and protects instrument cable leads as shown at 33a which are mounted along the inner walls of the duct, the cable leads being secured in place at the factory so that it is only necessary to connect the duct and attach the cable leads secured within the duct to the instruments and the engine to be tested.

For the controlled and silenced flow of air into the engine enclosure a primary air silencer section 38 is supported in a position overlaying the engine enclosure unit 10 by means of horizontal and vertical beam members 37. An air inlet screen 39 is provided at the entrance end of the air silencer section having spaced collers 40 separated by a reinforced screen portion 41 which acts to filter the air flowing into the air silencer section. The remainder of the air silencer section is made up of a tubular, insulated compartment 42 communicating with the air inlet screen, and a tubular elbow portion 43 interconnecting the tubular compartment 42 and the engine enclosure entrance duct 25. In prefabricating the tubular compartment 42 and air elbow section 43, sheet metal tubing 44 is formed to the desired lengths and insulated by means of a concentric, perforated tubing 45 spaced within the outer tubing to retain Fiberglas insulation 46 within the annular space formed between the concentric tubing lengths. In addition, the tubular compartment 42 is provided with another insulated tube length 47 which is spaced concentrically within the perforated and outer tubing by means of radial separator bars 48 spaced between the inner and outer concentric shells. In this way air induced into the compartment 42 is greatly reduced in turbulence and the air flow is straightened for passage into the enclosure unit; also, inner tubing 47 provides a double insulating layer for increased reduction of the noise of the high velocity air being induced into the engine unit. The air elbow portion 43 also contributes to noise reduction in providing an elliptical shaped head portion 43a at the closed end of the elbow which serves to trap much of the high frequency noise and also acts to reduce fluttering and vibration in the air silencer section by setting up a slight counter flow of air to the air flow entering the engine enclosure unit. For assembly of the silencer section the inner collar portion of the inlet screen portion 39, both ends of the compartment 42, together with the open ends of the air elbow 43 each have secured thereto adaptors 23 for interconnection between each component and for connection of the elbow to the entrance duct 26.

Other suitable positions of the primary air silencer section with respect to the engine enclosure unit may be selected according to the space requirements of the particular location chosen for assembly of the test stand. For instance, the entire section could be disposed at right angles to the engine enclosure unit or positioned to extend in the opposite direction to that shown. Furthermore, the entrance duct 26 and inlet opening 25 could be positioned in the side of the enclosure unit with the primary air silencer section leading either outwardly from the duct without use of the elbow portion 43 or, by using the elbow 43, could be extended rearwardly parallel to the enclosure unit. Of course, the most compact arrangement is illustrated in the preferred form.

In order to maintain optimum pressure conditions in the engine enclosure unit and to aid in the cooling of discharge gases expelled from the engine, a sound muffler system 50 is provided which includes a muffler compartment 51 coupled directly to the exit end of the engine enclosure unit 10 and secondary air silencer ducts 52 leading transversely into air flow openings 53a provided on opposite sides of the muffler compartment 51. The muffler compartment is formed of an insulated, outer shell 53 insulated in the same manner as the outer shell portion 12 of the engine enclosure unit. Positioned at the forward end of the muffler compartment are an annular air flow baffle 54 mating the baffle plate 13 provided at the exit end of the enclosure unit, and a tubular muffler 55 flared outwardly at the forward end for connection to the baffle 54 and extending rearwardly within the compartment to transfer the discharge gases away along with a limited amount of cooling air passing over the engine from the area surrounding the exit end of the engine enclosure unit. In this way, the pressure in the enclosure unit is maintained and is not affected by the high velocity gases which tend to reduce the pressure in the surrounding areas of the muffler compartment, and the sound waves of the discharge gases are insulated somewhat from the enclosure unit.

The secondary air silencer ducts 52 cooperate with the muffler and baffle portion in maintaining the pressure in the enclosure unit by introducing air into the low pressure areas surrounding the discharge gases escaping from the engine. Air is directed into the secondary air silencer ducts by means of rectangular-shaped elbows 56 having a screened-in opening 57 for filtering the entering air. A tubular compartment 58, formed in essentially the same manner as the tubular compartment 42 with concentric, insulated tubing, is connected into the inlet air elbows 56 to silence the air and conduct it into the muffler compartment. The air inlet elbows 56 are prefabricated with insulated panels 60 preassembled to form the enlarged, box-shaped elbow fittings which are utilized as efficient sound barriers or traps in much the same manner as the elliptical-shaped dome portion 43a in the primary air elbow 43. In providing air inlet conduits on opposite sides of the muffler compartment, pressure is thus evenly maintained in the compartment, and maximum cooling is accomplished by a thorough intermixing between the outside air and the discharge gases. In addition, direct cooling of the muffler compartment and an exhaust muffler or augmenter section 64 is accomplished so that standard materials can be utilized in construction without requiring special heat resistant properties. Sealed adaptors 23 are also secured at the open end portions of each of the air silencer parts for airtight connection therebetween and for connection between the muffler compartment and exit end of the enclosure unit.

By prefabricating the air silencer compartments and fittings in the secondary air inlet section, it is again possible to dispose the air silencer conduits in a number of modified positions, depending upon the amount of space and desired configuration of the test stand installation. For example, as shown in Fig. 2 the air silencer conduits can be assembled to extend at right angles to the longitudinal axis of the test stand simply by connecting the air silencer compartments 58 directly to the air flow openings 53 of the muffler compartment 51. By including elbow fittings 59, formed in the same manner as elbows 56 without the air inlet screen, the air silencer conduits can be extended rearwardly parallel to the longitudinal axis of the test stand as shown in Fig. 4 or extended vertically upward if necessary.

Further cooling and reduction in velocity of the discharge gases is accomplished in the exhaust muffler or augmenter section 64 which is secured to the rearward end of the muffler compartment 51. The augmenter section 64 consists in a prefabricated compartment 65 having an outer shell portion 66 formed of a tubular length of sheet metal or boilerplate, and an inner concentric tubing 67 which converges rearwardly from the forward end of the augmenter section then extends rearwardly and diverges at the rearward end of the augmenter section so as to define a venturi-shaped flow passageway to accomplish a reduction in velocity and diffusion of the gases. The inner tubing 67 is further separated from the shell 66 by means of transverse, annular formers or plates 68 selectively positioned in the annular space between the tubing to form separate acoustical chambers. Upper fill hatchways 69 are provided along the top surface of the outer shell portion 66 over each acoustical chamber for depositing granular acoustical material 70 into each acoustical chamber, and at corresponding positions along the bottom surface of the outer shell, cleanout hatchways 71 are provided for removal of the acoustical material 70 prior to disassembly of the test stand installation, or in order to change the acoustical material. To permit direct contact between the discharge gases and acoustical material, the inner tubing liner 67 is perforated, as shown at 72, at selected intervals throughout the length of the augmenter section. The discharge gases leaving the muffler compartment are thus further reduced in velocity, cooled and the noise and vibration limited by conducting the gases through the venturi-shaped passageway and in direct physical contact with an insulated formation of acoustical, insulated chambers. Furthermore, in testing a particular engine having definite noise frequencies, the insulated chambers can be tuned to counteract such frequencies simply by adjusting the space between the plates 68. The plates 68 also serve an added function in preventing removal or scooping of acoustical material by the high velocity discharge gases simply by positioning the panels at points immediately ahead of or behind each perforated section. Sealed adaptor flanges 23 are again secured to the ends of the augmenter section for airtight connection to the muffler compartment 51 by means of suitable latch bolts or the like. Suitable water connections 73 having spray attachments can also be projected into the forward end of the flow passageway for further cooling of the afterburner in jet engine testing.

An exhaust silencer section 75 is also prefabricated for connection into the augmenter section for the last stage reduction of noise and is broadly comprised of an exhaust silencer compartment 76 and discharge elbow 77, with a discharge stack 78 extending upwardly from the elbow 77 for removal of the gases into the atmosphere. To this end, the exhaust silencer compartment 76 is made up of a steel outer shell portion 79 enclosing an insulated lining composed of a perforated insulation retaining tube 80 and Fiberglas insulation 80a, metal cones 81 positioned transversely across the forward and rearward openings of the exhaust silencer compartment, together with an additional perforated tube portion 82 spaced concentrically within the silencer compartment and extending the length thereof. The perforated metal cones 81 act primarily to reduce the turbulence in the discharge gas flow creating the lower frequency noise and further act to retard the velocity of the discharge gases. The inner perforated tube or lining 82 is spaced within the insulated shell 79 by means of annular separator plates or panels 83 and, together with the tubing 82, act to prevent the scooping or removal of the insulating material along the inner surface of the shell 76 by the discharge gases.

The discharge elbow compartment 77 which is fastened to the rearward end of the exhaust silencer compartment 76 by means of sealed adaptors 23 is provided with an outer shell portion 84 and a cylindrical stack receiving opening 85 with a ring-shaped flange 85a protruding from the top surface of the shell 84 for connection of the discharge stack 78 therewith. Tubular shell 84 is closed at its rearward end by an eliptical-shaped sound trap 86, the entire shell being insulated in the same manner as the shell portion 79 of the exhaust silencer compartment with additional insulation provided in the sound trap portion 86. The discharge stack 78 is connected to the flange portion 85a of the receiving opening and forms a cylindrical exhaust gas outlet having an outer, insulated shell portion 87 with vertical Fiberglas panels 88 spaced across the discharge stack. The discharge gases are thereby expelled through the stack 78 with the sound trap 86 and metal cones 81 cooperating to reduce vibration and turbulence in the gas flow, and the vertical panels 88 aiding in the reduction of noise as the gases leave the test stand installation into the atmosphere.

A somewhat modified form of exhaust silencer section is illustrated in Fig. 4 in which a transition header portion 90 is shown positioned transversely across the exit end of the augmenter section so as to accommodate additional exhaust silencer sections in the testing of larger jet engines. The header is formed of an insulated outer shell with rearwardly disposed exhaust receiving openings for the exhaust silencers. In this way, the increased gas flow is divided along with the accompanying noise frequencies into two silencer sections to attain greater noise reduction capacity.

The assembly of the prefabricated sections can be carried out quickly and with little special skill required except for a knowledge of the arrangement of the various sections. The sections are preferably constructed of equal outer diameters so that the annular flanges 23 will mate each other without reduction or increase in diameter in connecting one section into another. Of course, since the engine enclosure unit is not necessarily of a tubular cross section the exhaust end of the unit is closed except for the circular opening at its exit end with a mating adaptor or flange 23 for connection to the muffler compartment and an air flow baffle plate secured to the peripheral edge of the opening. A primary feature of such a prefabricated type of construction is that many of the fittings and compartments may be interchanged to modify or alter the configurations of the sections to conform with the special requirements of the location chosen. Another important feature is that all the compartments forming each section can be made transportable, including the engine encolsure unit, due to the unique construction of the air flow and muffler system. At the same time the stand has universal application as a testing enclosure for propulsive type engines.

The connection members provided between the compartments and the sections can be made up of any of the standard types of attachments which will provide airtight fittings throughout the entire test stand. In the preferred form described, the adaptor flanges 23 are ring-shaped angle iron members secured to the inner surfaces of the outer shell portions at the ends thereof. The flanges 23 may also be secured to the inner perforated tubing, such as the tubing 15 in the engine enclosure unit 10, so that the outer projecting portions of the flange will be flush with the outer surfaces of the shell portions. The ring shaped adaptor flanges 23 are each provided with a thick gasket and bolted connections to secure the flanges together in sealed relation.

No special foundations for the test stand installations are required, the only limitation being that the test stand installation be substantially level and firmly supported. As shown in Fig. 4, saddle supports 92 act as foundations for the exhaust silencer sections to limit any possible vibration or shaking of the compartments; also the beam members 37 support the primary air silencer section 38 both against vertical and horizontal vibration due to the length of the section and the high velocity air flowing therethrough. Rail members 93 can also be used as shown to support the enclosure unit 10 in level position, and upright supports 94 are shown provided under the elbow compartments 56 and 59 to maintain the secondary air silencer sections in a level plane with the rest of the test stand.

In performing an engine testing operation the front panels of the engine enclosure unit are opened and the engine to be tested is lifted into the enclosure unit and on to the thrust measuring stand 17 with the exhaust portion of the engine disposed at the entrance to the muffler 55. The cable leads secured to the inner lining of the instrument duct 33 are then connected into the engine, and the test operation is initiated.

To maintain the pressure within the enclosure unit substantially at atmospheric conditions the exit end of the enclosure unit is substantially restricted by the muffler 55 and baffles 13 and 54 as described so that the low pressure area in the muffler compartment does not affect the pressure within the enclosure unit. In addition, optimum air flow into the engine with relatively low turbulence and high velocity is accomplished by the unique construction of the air silencer section, having particular reference to the inner insulated tubing 47 which not only straightens the flow of air but aids in the noise reduction qualities of the air silencer. This is important, not only in limiting the noise in the primary air silencer, but also in the engine enclosure unit so that it is possible to prefabricate the enclosure unit with minimum provision for insulation and avoid the necessity of a bulky, more permanent construction, such as concrete. The muffler compartment 51 cooperates with the primary air silencer section in limiting the noise frequency in the enclosure unit by providing the restricted opening at the exhaust end of the engine. The noise frequencies accompanying the discharge gases are thereby prevented to a great extent from returning into the enclosure unit around the outside of the discharge end of the engine. Furthermore, by positioning the secondary air silencer section behind the enclosure unit instead of at some intermediate point communicating with the enclosure unit the enclosure unit may be made much smaller and therefore may be prefabricated into transportable compartments 12. In providing a highly insulated augmenter section immediately following the muffler compartment, much of the high frequency noise is absorbed from the discharge gases so that there is very little tendency for the sound waves to return into the enclosure unit.

Dependent upon the size and air flow capacity of the engines to be tested by a particular test stand installation, the preferred form of test stand as described may be simplified considerably where less expensive and smaller units are desired. For instance, in a highly simplified construction the inner insulated tubing in the primary air silencer section and the secondary air silencer section could be eliminated, the silencer compartments connected directly into the enclosure unit and muffler compartment without the use of elbow fittings, and the exhaust silencer section connected directly into the muffler compartment thus excluding the augmenter section. Also, the metal cones 81 would not always be necessary. Due to the individual construction of each section, it will therefore be noted that various modifications or changes may be made in the test stand installation as described including the exclusion of many of the unique features of the test stand where high performance testing is not required. Of course, where such testing would be later required, in view of the flexibility and interchangeability of the sections it would be a simple matter to make the required additions to accommodate increased air flow and discharge gas flow.

To those skilled in the art to which our invention relates it is therefore to be understood that many changes in the construction and widely different embodiments and applications of the present invention will suggest themselves without departing from the spirit and scope of the invention. The description and operation herein disclosed are thus purely illustrative and are not intended to be in any sense limiting.

We claim:

1. A prefabricated engine test stand installation comprising, in combination: an engine enclosure section having a continuous outer shell formed of a plurality of connected, insulated metallic compartments provided with air flow openings at the forward and rearward portions of said shell; operator control means associated with said engine enclosure section; a primary air silencer section communicating with the forward air flow opening of said engine enclosure section formed of an insulated tubular compartment, an inner concentric, insulated tube spaced within said compartment extending the length of said air silencer section, and an air inlet screen portion to filter the air induced therethrough; a secondary air silencer section including a muffler compartment disposed at the rearward end of said engine enclosure section, transverse air flow fittings leading into said muffler compartment, and elongate air conduits including air inlet screens each formed of an insulated tubular compartment communicating with said transverse air flow fitttings to provide silenced air flow into said muffler compartment; an augmenter section extending rearwardly from said muffler compartment to cool and to reduce the velocity and pressure of the discharge gases, said augmenter section consisting of an outer tubular shell having an inner concentric, perforated tube disposed therein with acoustic material distributed throughout the annular space therebetween; and exhaust silencer section connected to the rearward end of said augmenter section, said exhaust silencer section being formed of a plurality of connected, tubular compartments insulated for noise reduction of the air, one of said compartments comprising an insulated discharge stack, another of said compartments including a rearwardly disposed sound trap compartment to reduce fluttering and vibration and to alter the direction of air flow through said insulated discharge stack, each of said compartments and fittings in said test stand installation being provided with detachable couplings for interconnection of said compartments and connection between each section whereby said test stand can be assembled for testing, and disassembled for shipment to another location.

2. The aircraft engine test stand installation according to claim 1 in which said exhaust silencer section is further characterized by the disposition of perforated metal cones positioned transversely across the path of fluid flow therethrough at spaced intervals therealong, to thereby reduce the turbulence and low frequency noise of the discharge gases.

3. The aircraft engine test stand installation according to claim 1 in which said exhaust silencer section is further characterized by the interpositioning of a perforated tubular lining within said section so as to prevent the unrestricted flow of turbulent gases in direct contact with the insulated shell of said exhaust silencer conduits.

4. The aircraft engine test stand installation according to claim 1 in which said primary air silencer section is positioned horizontally over said engine enclosure section with the exit portion of said air inlet section disposed over the said air flow opening of said engine enclosure section, an insulated tubular elbow-shaped fitting interconnecting said exit portion and said forward air flow opening.

5. In an aircraft engine test stand installation in which there is provided an engine enclosure unit having a discharge end, an operator's enclosure unit, and muffler chamber connected to the discharge end of said engine enclosure unit, the combination therewith, comprising: an air silencer system consisting of a primary air silencer section communicating with the forward end of said engine enclosure unit and secondary air silencer sections communicating with the muffler chamber, said primary and secondary air silencer sections each formed of a series of tubular, insulated metallic lengths prefabricated to include coupling members at the ends thereof for rapid interconnection and assembly, said silencer sections further having air inlet screens at the distal ends thereof; an augmenter section having a tubular outer shell portion and a venturi-shaped, inner concentric tube spaced therewithin to conduct the discharge gases rearwardly from said muffler chamber, the annular space between the outer shell and inner tube being filled with acoustical material; an exhaust silencer system communicating with said augmenter section for the silenced discharge of air therethrough, said exhaust silencer system consisting of a trinsistion header portion connected to said augmenter section, exhaust silencer sections extending from said transition header portion, and discharge stacks disposed at the rearward end of each exhaust silencer section, said exhaust silencer sections and discharge stack formed of a series of tubular, insulated metallic lengths also prefabricated to include detachable couplings for rapid interconnection and assembly.

6. The aircraft engine test stand according to claim 5 in which the exhaust silencer sections are provided with perforated metal cone portions positioned transversely across the path of air flow in a rearwardly convergent direction at spaced intervals therealong to reduce the turbulence and low frequency sound waves in the discharge gases.

7. The aircraft engine test stand installation according to claim 5 in which the insulated discharge portions of each of said exhaust silencer sections include a circular discharge stack having a plurality of insulated panels spaced thereacross to further limit the noise characteristics of the discharge gases.

8. The aircraft engine test stand installation according to claim 5 in which said augmenter section is further characterized by upper fill hatchways to deposit acoustical material in the annular space and lower cleanout hatchways for removal of the acoustical material.

9. The aircraft engine test stand installation according to claim 8 in which annular plates are spaced between said inner concentric tube and outer shell portion and between each of said hatchways so as to form divided acoustical chambers for the absorption of sound from the discharge gases.

10. A prefabricated test stand installation for quick assembly and use in the noise limiting testing of jet engines, comprising the combination of: an inverted U-shaped engine enclosure unit having an outer metallic shell formed of transportable compartments, an air flow elbow fitting passing upwardly from the top surface of the forward compartment, and means disposed in said unit for mounting of the engine therein; an operator's enclosure unit for controlling the operation of the engine in said engine enclosure unit and spaced from said engine enclosure unit in communication therewith; a primary air silencer section disposed in horizontal position over said engine enclosure unit communicating at one end with said air flow elbow and having an air inlet screen at the opposite end for the passage of air therethrough into said engine enclosure unit, said air silencer section prefabricated to include an insulated, tubular compartment and a concentric, insulated tubing member spaced therein to straighten the flow of air entering said engine enclosure, and a domed head portion adjacent the entrance into said engine enclosure unit to reduce the noise and turbulence of air flowing through said primary air silencer section; a secondary air silencer portion including a muffler compartment connected to the discharge end of said engine enclosure unit, said muffler compartment formed of a metallic shell and prefabricated to include a discharge baffle plate positioned transversely across the end thereof adjacent said engine enclosure unit and in which is mounted a tubular muffler for the escape of discharge gases, air silencer conduits leading into said muffler compartment for the silenced flow of air therein, each of said air silencer conduits formed of a tubular, metallic compartment and prefabricated to include an insulated inner lining and an insulated, concentric tubing spaced therein to extend the length of said compartment, and an air inlet screen at the end of each conduit; an augmenter section passing rearwardly from said muffler compartment formed of a tubular compartment and prefabricated to include an inner spaced, concentric tube defining a venturi-shaped passageway extending the length of said augmenter section to reduce the discharge gas velocity, the annular space between said tube and outer compartment being filled with acoustical material, said inner tube being perforated at selected intervals therealong for direct physical contact between the discharge gases and acoustical material, and upper and lower fill hatchways positioned in communication with the annular space for the respective filling and removal of acoustical material therein; at least one exhaust silencer section communicating with said augmenter section, said exhaust section formed of forward and exit tubular, insulated compartments, the forward compartment prefabricated to include an inner perforated lining spaced concentrically within said insulated compartment so as to define a rearward continuation of the venturi-shaped passageway in said augmenter section, perforated cones positioned transversely across said inner lining at selected intervals therealong, the exit compartment of said exhaust silencer section constituting a discharge elbow having a discharge stack and sound trap portion to reduce fluttering and vibration of the air leaving the exhaust silencer section, and a transition compartment interconnecting said augmenter and exhaust silencer sections to accommodate at least one exhaust silencer section, each of the compartments comprising the test stand installation having connecting means for interconnection therebetween in seal-tight relation, and each of said sections and fittings, enclosure units, having sealed adaptors at the ends thereof for quick assembly of said test stand whereby a self-contained noise limiting test installation is formed which is universally conformable for the testing of aircraft engines.

References Cited in the file of this patent

UNITED STATES PATENTS

| | | |
|---|---|---|
| 1,067,200 | Schlosberg | July 8, 1913 |
| 1,964,845 | Dietze et al. | July 3, 1934 |
| 2,138,510 | Rauen | Nov. 29, 1938 |
| 2,270,825 | Parkinson et al. | Jan. 20, 1942 |
| 2,674,335 | Lemmerman | Apr. 6, 1954 |
| 2,713,397 | Klausmeyer | July 19, 1955 |
| 2,720,276 | Droeger | Oct. 11, 1955 |

OTHER REFERENCES

Article from "Noise Control," vol. 2, No. 1 pages 10–14 and 65, January 1956.